US010018964B2

(12) United States Patent
Helfer et al.

(10) Patent No.: US 10,018,964 B2
(45) Date of Patent: Jul. 10, 2018

(54) COMPACT BALANCE SPRING OF VARIABLE SECTION

(71) Applicant: ETA SA Manufacture Horlogere Suisse, Grenchen (CH)

(72) Inventors: Jean-Luc Helfer, Le Landeron (CH); Yves-Alain Cosandier, Renens (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 0 days.

(21) Appl. No.: 15/286,949

(22) Filed: Oct. 6, 2016

(65) Prior Publication Data

US 2017/0115629 A1 Apr. 27, 2017

(30) Foreign Application Priority Data

Oct. 22, 2015 (EP) .................................. 15191115

(51) Int. Cl.
| | |
|---|---|
| *G04B 17/06* | (2006.01) |
| *G04B 17/32* | (2006.01) |
| *G04B 17/34* | (2006.01) |
| *F16F 1/32* | (2006.01) |
| *F16F 1/04* | (2006.01) |
| *F16F 1/10* | (2006.01) |

(52) U.S. Cl.
CPC ............ *G04B 17/063* (2013.01); *F16F 1/043* (2013.01); *F16F 1/047* (2013.01); *F16F 1/10* (2013.01); *G04B 17/066* (2013.01); *G04B 17/32* (2013.01); *G04B 17/34* (2013.01); *G04B 17/345* (2013.01)

(58) Field of Classification Search
CPC .... G04B 17/063; G04B 17/066; G04B 17/32; G04B 17/345; F16F 1/326
See application file for complete search history.

(56) References Cited

U.S. PATENT DOCUMENTS

| 209,642 | A | * | 11/1878 | Berlitz et al. ........ | G04B 17/066 368/175 |
|---|---|---|---|---|---|
| 2010/0027382 | A1 | | 2/2010 | Daout et al. | |
| 2011/0069591 | A1 | * | 3/2011 | Daout .................. | G04B 17/066 368/175 |
| 2011/0249537 | A1 | * | 10/2011 | Daout .................. | G04B 17/066 368/177 |

(Continued)

FOREIGN PATENT DOCUMENTS

| CH | 706087 A1 * | 8/2013 | ........... G04B 17/066 |
|---|---|---|---|
| EP | 2 151 722 A1 | 2/2010 | |
| EP | 2 299 336 A2 | 3/2011 | |

OTHER PUBLICATIONS

Niaritsiry, Tiavina, CH 70607 English Translation, originally published Aug. 15, 2013, full document.*

(Continued)

*Primary Examiner* — Amy Cohen Johnson
*Assistant Examiner* — Daniel Wicklund
(74) *Attorney, Agent, or Firm* — Oblon, McClelland, Maier & Neustadt, L.L.P.

(57) ABSTRACT

A one-piece balance spring includes a single strip wound on itself between an inner coil and an outer coil. The strip has a geometry such that when the angle of contraction of the balance spring has a value of 360 degrees, there is a constant distance between each coil from the second coil to the penultimate coil.

10 Claims, 4 Drawing Sheets

(56) References Cited

U.S. PATENT DOCUMENTS

| | | | |
|---|---|---|---|
| 2013/0176834 A1* | 7/2013 | Helfer | G04B 17/063 368/171 |
| 2015/0168916 A1* | 6/2015 | Conus | G04B 17/063 368/175 |
| 2015/0248113 A1* | 9/2015 | Bucaille | G04B 17/06 368/175 |
| 2017/0255163 A1* | 9/2017 | Helfer | G04B 17/063 |

OTHER PUBLICATIONS

European Search Report dated Mar. 24, 2016 in European Application 15191115.3 filed on Oct. 22, 2015 (with English Translation of Categories of cited documents).

* cited by examiner

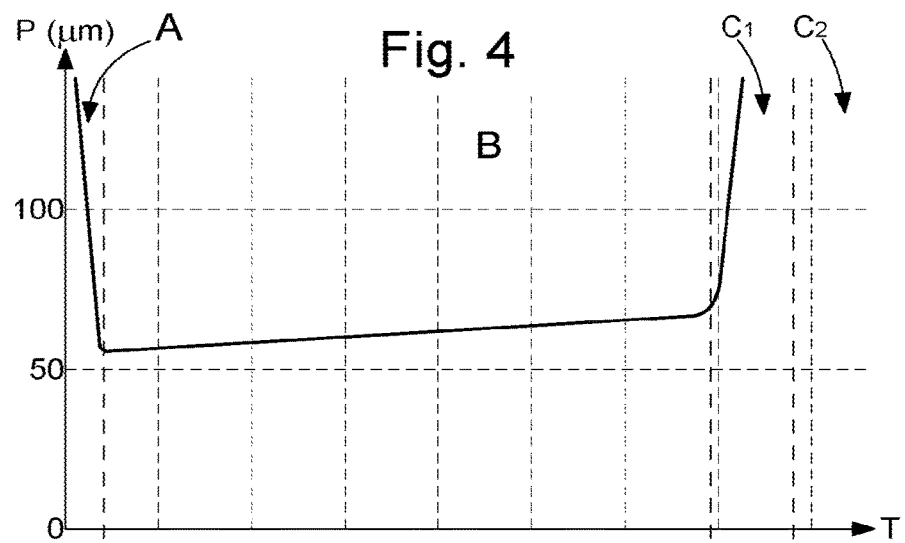
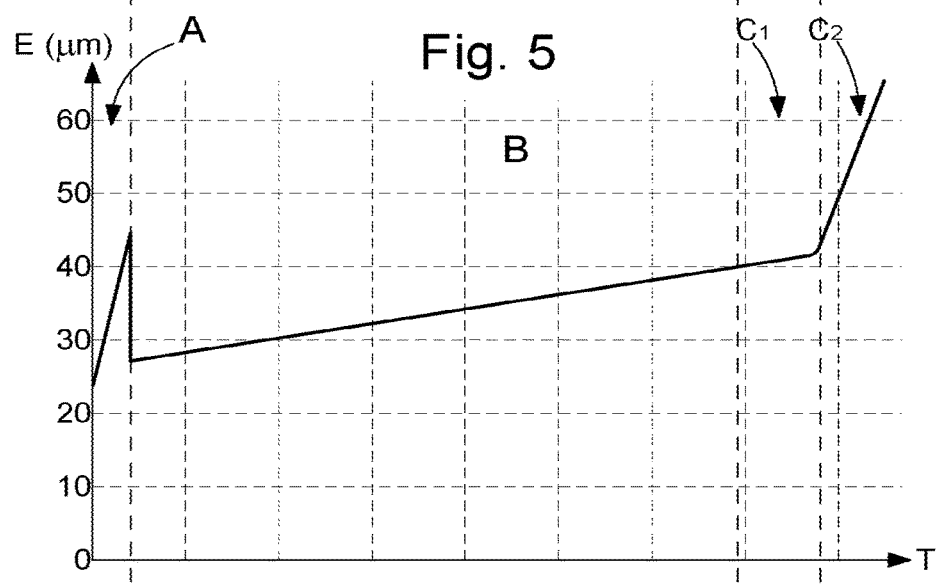
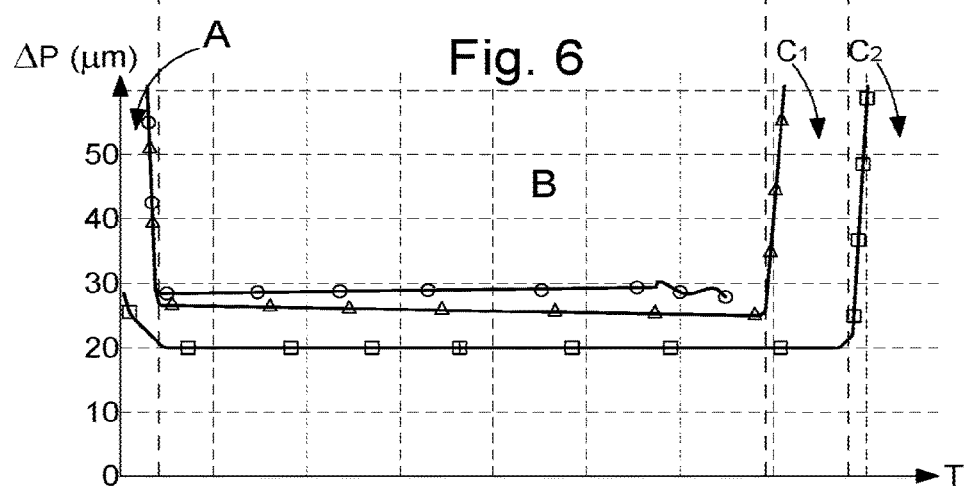

COMPACT BALANCE SPRING OF VARIABLE SECTION

This application claims priority from European Patent application 15191115.3 of Oct. 22, 2015, the entire disclosure of which is hereby incorporated herein by reference.

FIELD OF THE INVENTION

The invention relates to a compact balance spring, and, more particularly, a balance spring of this type intended to cooperate with a balance to form a resonator.

BACKGROUND OF THE INVENTION

The cost of a silicon balance spring is substantially proportional to its surface area, i.e. the more balance springs can be etched on the same wafer, the lower the unit cost of the balance spring.

However, it is not possible to randomly decrease dimensions since the coils of a balance spring must not touch each other either in contraction or expansion.

SUMMARY OF THE INVENTION

It is an object of the present invention to overcome all of part of aforecited drawbacks by proposing a compact balance spring while ensuring that its coils do not touch each other either in contraction or expansion.

To this end, the invention relates to a one-piece balance spring comprising a single strip wound on itself between an inner coil and an outer coil, the strip comprising, at rest, between the end of the inner coil and the second coil, a first area wherein the pitch continuously decreases and the section continuously increases, a second area, in the extension of the first area, wherein the pitch between each coil continuously increases and the strip section starts at a smaller value than the section at the end of area A, then continuously increases such that, when the angle of contraction of the balance spring has a value of 360 degrees, there is a constant distance between each coil from the second coil to the penultimate coil.

Advantageously according to the invention, it is understood that the balance spring is as compact as possible while ensuring a constant minimum distance between the coils in contraction and, possibly also in expansion. Therefore, one can attempt to minimise the size of the balance spring without losing timekeeping properties. With such a balance spring it is possible to optimise the number of balance springs etched on the same wafer in order to reduce the unit cost.

In accordance with other advantageous variants of the invention:
  in the second area, the pitch between each coil continuously increases by a constant value;
  in the second area, the section of the strip continuously increases by a constant value;
  in the first area, the pitch between each coil continuously decreases by a constant value between the end of the inner coil and the junction thereof with the second area;
  in the first area, the section of the strip continuously increases by a constant value between the end of the inner coil and the junction thereof with the second area;
  the balance spring includes a third area, in the extension of the second area and comprised between the start of the penultimate coil and the end of the outer coil, wherein the pitch continuously increases such that when the angle of expansion of the balance spring has a value of 360 degrees, there is a minimum distance between the second coil and the outer coil to prevent any contact therebetween;
  in the third area, the pitch continuously increases by a constant value;
  the third area includes a first portion whose section increases in a substantially identical manner relative to that of the second area and a second portion, in the extension of the first portion, whose section increases as it approaches the end of the outer coil, the increase in section in the second portion being greater than the increase in section in the first portion;
  the balance spring is silicon-based.

Moreover, the invention relates to a resonator characterized in that it includes a balance cooperating with a balance spring according to any of the preceding variants.

BRIEF DESCRIPTION OF THE DRAWINGS

Other features and advantages will appear clearly from the following description, given by way of non-limiting illustration, with reference to the annexed drawings, in which:

FIG. 4 is a graph showing the change of pitch between the coils as a function of the number of coils of the balance spring;

FIG. 5 is a graph showing the change in thickness of the coils as a function of the number of coils of the balance spring;

FIG. 6 is a graph showing the change in distance between the coils as a function of the number of coils of the balance spring and of the state of the balance spring.

DETAILED DESCRIPTION OF PREFERRED EMBODIMENTS

The invention relates to a compact balance spring intended to cooperate with a balance to form a sprung-balance type resonator for timepieces. Of course, the balance spring may include a collet integral with the end of the inner coil and/or a stud attachment integral with the end of the outer coil without departing from the scope of the invention. However, for the sake of simplicity of the description, no collet and/or attachment is illustrated.

The development of the present invention was initiated to produce a maximum number of balance springs on the same silicon-based wafer while ensuring that the coils of each balance spring do not touch each other either in contraction or expansion. However, it is understood that the balance spring is not limited to a silicon-based material. In a non-limiting manner, it is understood that the same logic is applicable to a balance spring formed from a LIGA method, i.e. using an electrically conductive material.

The term "silicon-based" means a material including single crystal silicon, doped single crystal silicon, polycrystalline silicon, doped polycrystalline silicon, porous silicon, silicon oxide, quartz, silica, silicon nitride or silicon carbide. Of course, when the silicon-based material is in crystalline phase, any crystalline orientation may be used.

Figure 2:
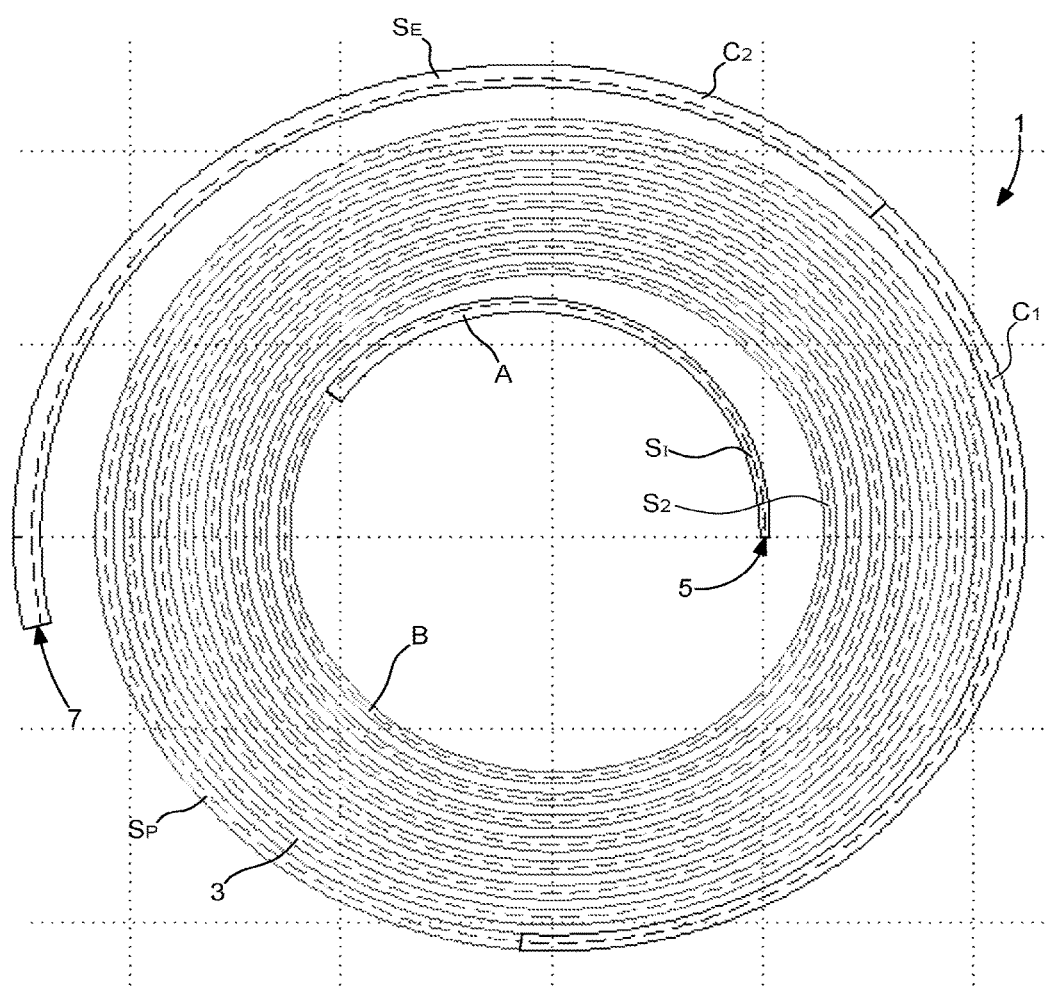
FIG. 2 is a top view of a balance spring according to the invention in the rest position.

As illustrated in FIG. 2, the invention therefore relates to a one-piece balance spring 1 comprising a single strip 3 wound on itself between an inner coil $S_I$ and an outer coil $S_E$. According to the invention, strip 3 of balance spring 1, in the rest position illustrated in FIG. 2, comprises between end 5 of inner coil $S_I$ and the start of second coil $S_2$, a first area A wherein the pitch between inner coil $S_I$ and second coil $S_2$ decreases.

Figure 1:
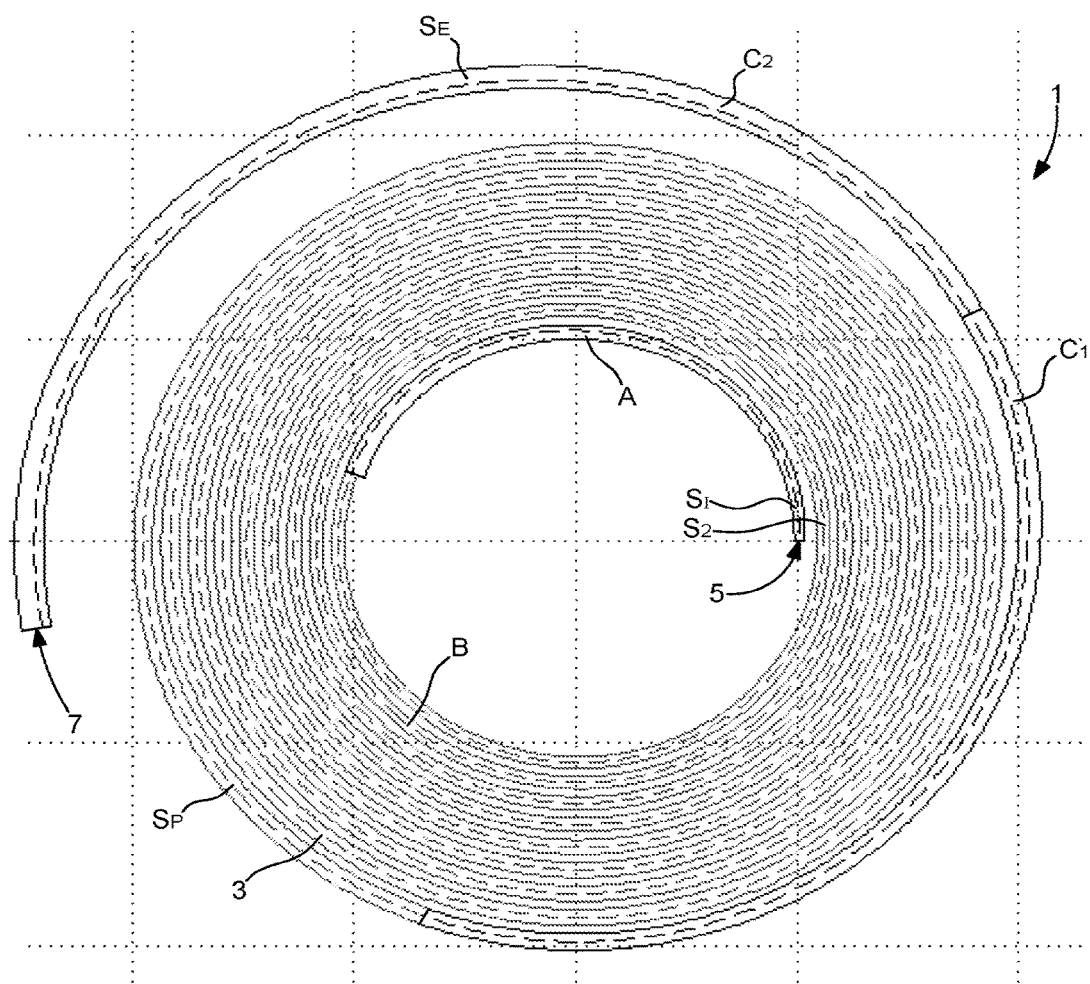
FIG. 1 is a top view of a balance spring according to the invention in a contracted state.

Advantageously, balance spring 1 comprises, in the extension of first area A, a second area B, wherein the pitch between each coil and the section of strip 3 continuously increase such that when balance spring 1 is in contraction, i.e. when end 5 of inner coil $S_I$ has effected a rotation of substantially −360 degrees with respect to the centre of balance spring 1, as seen in FIG. 1, there is a substantially constant distance between each coil from second coil $S_2$ to the penultimate coil $S_P$.

Preferably, as illustrated in FIG. 4, the pitch between each coil continuously increases by a constant value in second area B. Moreover, as illustrated in FIG. 5, preferably according to the invention, the section of strip 3 continuously increases by a constant value in second area B. Thus, for example, the section may have a variable thickness comprised between 10 μm and 75 μm and a constant height comprised between 50 μm and 250 μm.

Figure 3:
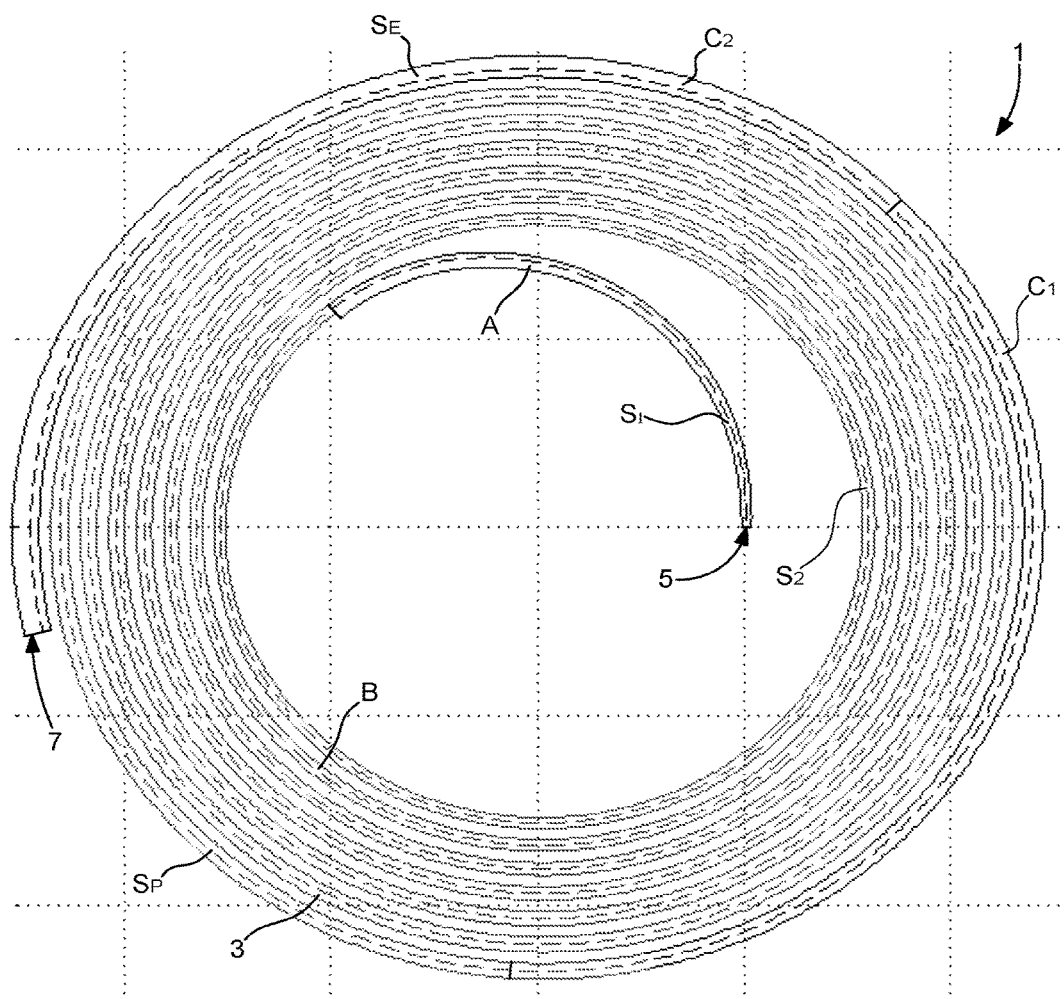
FIG. 3 is a top view of a balance spring according to the invention in an expanded state.

According to an additional optional feature, according to the invention the balance spring advantageously comprises a third area C, in the extension of second area B and comprised between the start of penultimate coil $S_P$ and end 7 of outer coil $S_E$, wherein the pitch, between penultimate coil $S_P$ and outer coil $S_E$, continuously increases such that when balance spring 1 is in expansion, i.e. when end 5 of inner coil $S_I$ has effected a rotation of substantially +360 degrees with respect to the centre of balance spring 1, as seen in FIG. 3, there is a minimum distance between the last coils to prevent any contact, especially between penultimate coil $S_P$ and outer coil $S_E$.

Preferably, as illustrated in FIG. 4, the pitch between each coil continuously increases by a second constant value in third area C. As seen in FIG. 4, the second constant value is preferably greater than the first constant value of second area B.

Moreover, as illustrated in FIG. 5, preferably according to the invention, the third area C includes a first portion $C_1$ whose section increases in a substantially identical manner relative to that of second area B and a second portion $C_2$, in the extension of first portion $C_1$, whose section increases as it approaches end 7 of outer coil $S_E$, the increase in section in second portion $C_2$ being greater than the increase in section in first portion $C_1$. Thus, for example, the section may have a variable thickness comprised between 25 and 100 μm and a constant height comprised between 50 μm and 250 μm.

A first graph showing the change in pitch P between the coils as a function of the number of coils of the balance spring is illustrated in FIG. 4. It can be seen that in first area A of balance spring 1, the pitch decreases in a substantially constant manner until the start of second area B. In FIG. 4 it can be seen that second area B has a constant increase in pitch up to third area C. This latter area C has a constant increase in pitch up to end 7 of outer coil $S_E$. As seen in FIG. 4, the constant pitch increase in third area C is much more pronounced than that in area B.

In a complementary manner, a second graph showing the change in thickness E of the coils as a function of the number of coils of the balance spring is illustrated in FIG. 5. It can be seen that, in first area A of balance spring 1, thickness increases up to the start of second area B, where it decreases again to a value close to the section at the start of first area A. In FIG. 5, it can be seen that second area B has a constant increase in section up to second portion $C_2$ of third area C. Second portion $C_2$ has a constant pitch increase up to end 7 of outer coil $S_E$. As seen in FIG. 5, the constant increase in section in second portion $C_2$ is much more pronounced than that of area B.

Finally, a graph showing the change ΔP in distance between the coils as a function of the number of coils of the balance spring is illustrated in FIG. 6. More specifically, the distance between coils is illustrated for the balance spring in the contracted state of FIG. 1 (curve marked with a square □), in the rest state of FIG. 2 (curve marked with a triangle Δ) and, in the expanded state of FIG. 3 (curve marked with a circle O).

Consequently, in the expanded state marked with a circle (O), it can be seen that, in first area A of balance spring 1, the distance between the coils decreases up to the start of second area B. It is noted, thereafter, that in second and third areas B and C the distance ΔP between the coils is substantially constant up to end 7 of balance spring 1.

In the rest state in the curve marked with a triangle (Δ), it can be seen that, in first area A of balance spring 1, the distance ΔP between the coils decreases up to the start of the third area C. In particular, there is a much more pronounced, substantially continuous decrease in area A and then a more measured decrease with substantially constant slope in area B. It is noted, thereafter, that third area C has a distance ΔP between the coils that continuously increases up to end 7 of balance spring 1.

Finally, in the contracted state marked with a square (□), it can be seen that, in first area A, the distance ΔP between the coils decreases up to the start of second area B. It is noted, thereafter, in second area B of balance spring 1, that the distance ΔP between the coils is advantageously constant and equal to a minimum value. Finally, in third area C there is a continuous increase in distance between the coils towards end 7 of outer coil $S_E$.

In FIG. 6, it is noted that the minimum values of the curves with a circle (O) and a square (□) are not identical. However, they could be made geometrically identical.

Similarly, the values described in FIGS. 4 to 6 are used merely as examples. Depending on the configurations of the balance spring and/or of the resonator to which it belongs, the minimum value chosen could be different from the 20 μm chosen as an example in FIG. 6. It is therefore clear that the minimum value of the curves with a circle (O) and a square (□) could each be chosen to be less than or greater than 20 μm.

Advantageously according to the invention, it is understood, however, that these particular characteristics of balance spring 1 give the spring maximum compactness at rest while guaranteeing a constant minimum distance between the coils in contraction and, possibly, also in expansion. Typically, balance spring 1 at rest has 8.5 coils in a maximum radius of approximately 1.3 millimeters, i.e. the distance between the geometric centre of balance spring 1 and end 7 of outer coil $S_E$. For the sake of completeness, the study revealed that the distance between the geometric centre of balance spring 1 and end 5 of inner coil $S_E$ was approximately 0.5 millimeters. The size of the balance spring can therefore be minimised without thereby losing timekeeping properties. With the balance spring of the invention it is possible to optimise the number of balance springs etched on the same wafer in order to reduce the unit cost.

Of course, the present invention is not limited to the illustrated example but is capable of various variants and modifications that will appear to those skilled in the art. In particular, the geometry, i.e. the variations in pitch and section, such as for example the thickness and number of coils, may vary depending on the envisaged applications.

For example, in addition, the number of coils could be reduced to still further decrease the size of the balance spring.

It is also clear that the 360° angle of contraction of or expansion could be smaller without departing from the scope of the invention Indeed, this angle was chosen because mechanically the angle cannot theoretically be exceeded. However, the important point is not the angle at which the distance is minimum, but rather to ensure that the minimum distance is never exceeded. It is therefore understood that the angle could deliberately be chosen to be lower since, depending on the configuration of the movement, it is clear that this angle will not be exceeded in normal operation.

Further, the ordinate values in FIG. 4 are non-limiting. Thus, depending on the section of second area B, the maximum pitch of first area A and/or of third area C may vary. It is therefore clear that only the pitch variations are retained, but not necessarily with the same minimum and/or maximum values.

Similarly, the ordinate values in FIG. 5 are non-limiting. Thus, depending on the thickness of second area B, the maximum thickness of first area A and/or of third area C may vary. It is thus understood that only the thickness variations are retained, but not necessarily with the same minimum and/or maximum values.

Finally, although the calculations were made from the thickness variation, it is clear that the variation must be understood as a variation in section, i.e. in height and/or in thickness of the strip of the balance spring.

What is claimed is:

1. A one-piece balance spring comprising: a single strip comprising a plurality of coils including an inner coil, an outer coil, a second coil, and a penultimate coil, the strip comprising, at rest, between an end of the inner coil and a second coil, a first area wherein a pitch continuously decreases and a thickness continuously increases, a second area, extending from an outer end of the first area, wherein the pitch between each coil continuously increases and the thickness of the strip starts at a smaller value than a thickness at the outer end of the first area, then continuously increases such that, when an angle of contraction of the balance spring has a value of 360 degrees, there is a constant distance between each coil from the second coil to the penultimate coil.

2. The one-piece balance spring according to claim 1, wherein, in the second area, the pitch between each coil continuously increases by a constant value.

3. The one-piece balance spring according to claim 1, wherein, in the second area, the thickness of the strip continuously increases by a constant value.

4. The one-piece balance spring according to claim 1, wherein, in the first area, the pitch between each coil continuously decreases by a constant value between the end of the inner coil and before the beginning of the second area.

5. The one-piece balance spring according to claim 1, wherein, in the first area, the thickness of the strip continuously increases by a constant value between the end of the inner coil and before the beginning of the second area.

6. The one-piece balance spring according to claim 1, wherein the balance spring includes a third area, extending from an outer end of the second area and comprised between the penultimate coil and the end of the outer coil, wherein the pitch continuously increases such that, when the angle of expansion of the balance spring has a value of 360 degrees, there is a minimum distance between the second coil and the outer coil to prevent any contact therebetween.

7. The one-piece balance spring according to claim 6, wherein, in the third area, the pitch continuously increases by a constant value.

8. The one-piece balance spring according to claim 7, wherein the third area includes a first portion whose thickness increases in a substantially identical manner relative to that of the second area and a second portion, extending from the first portion, whose thickness increases towards the end of the outer coil, the increase in thickness in the second portion being greater than the increase in thickness in the first portion.

9. The one-piece balance spring according to claim 1, wherein the balance spring is silicon-based.

10. A resonator wherein the resonator includes a balance cooperating with a one-piece balance spring according to claim 1.

* * * * *